No. 748,385. PATENTED DEC. 29, 1903.
D. M. LESTER.
CLAMP COLLAR.
APPLICATION FILED APR. 30, 1903.

NO MODEL.

Witnesses
Frank D. Devine
May F. Ritchie

Daniel M. Lester, Inventor,
by Frank H. Allen
Attorney

No. 748,385.

Patented December 29, 1903.

UNITED STATES PATENT OFFICE.

DANIEL M. LESTER, OF NORWICH, CONNECTICUT.

CLAMP-COLLAR.

SPECIFICATION forming part of Letters Patent No. 748,385, dated December 29, 1903.

Application filed April 30, 1903. Serial No. 155,027. (No model.)

*To all whom it may concern:*

Be it known that I, DANIEL M. LESTER, a citizen of the United States, residing at Norwich, in the county of New London and State of Connecticut, have invented a new and useful Improvement in Clamp-Collars, of which the following is a specification.

The object of this invention is to provide convenient, cheap, and effective means for removably securing split collars to shafts, my new device being particularly advantageous for use with the hubs of cams and pulleys that require to be immovably fixed upon their shafts when in service.

The drawings accompanying this specification illustrate my invention.

Figure 1:
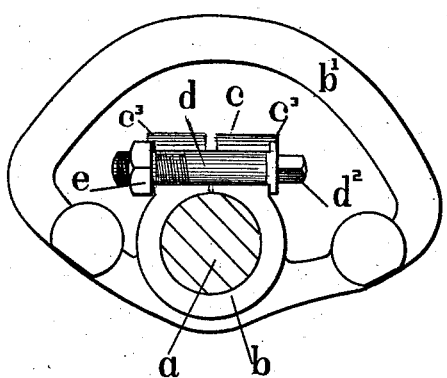
Figure 2:
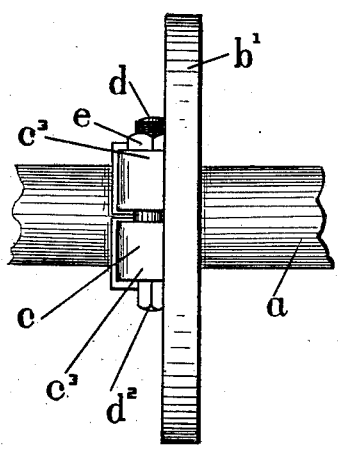
Figure 3:
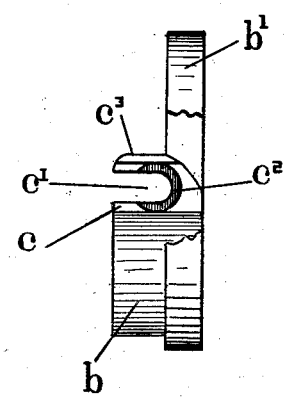
Figure 4:
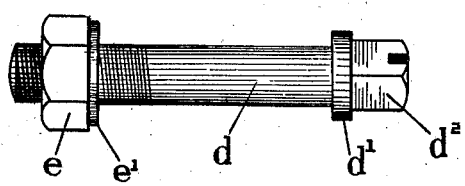

Figure 1 is a side view of a skeleton cam whose hub is secured upon a shaft by my improved means. In this view the shaft is shown in transverse section. Fig. 2 is an edge view of said cam as seen from the top of Fig. 1. Fig. 3 is an edge view of the cam alone as viewed from the right hand of Fig. 1, a portion of the rim of said cam being broken away to show more clearly the seat provided for the clamping-bolt. Fig. 4 is a side view of said clamping-bolt.

The characteristic feature of my invention consists in a peculiar arrangement of clamping-bolt and a seat for the same whereby the bolt may be readily tightened or loosened without becoming disconnected from the cam, or the bolt may be entirely separated from the cam, if desired, without removing the cam from the shaft.

Referring to the drawings, the letter $a$ indicates a shaft having mounted thereon a collar $b$, that carries a skeleton cam $b'$, that is formed, as here shown, as an integral part of said collar.

The collar $b$ is formed with a radial extension $c$, that is split through to the central opening of the collar, as is best seen in Figs. 1 and 2, and this extension $c$ is grooved throughout its length—that is to say, at right angles to the axial center of shaft $a$, as at $c'$—the groove or chamber thus provided being of a size to just receive the body of a bolt $d$.

The ends of groove $c'$ are counterbored, as at $c^2$, and the head of the bolt is formed with a circular flange $d'$ of a size adapted to enter and nearly fill one of the said counterbored ends $c^2$. The nut $e$ is also formed with a flanged end $e'$, that is adapted to enter the other counterbored end of the groove $c'$. After the bolt has been laid in the groove $c'$ the head $d^2$ is first turned sufficiently to draw the flanges of the nut and bolt into the described counterbores. This results in locking the bolt within the groove $c'$—that is to say, the bolt cannot be removed from the groove without first partially unscrewing the bolt from the nut, so as to permit the flanges to be removed from their seats in the counterbores $c^2$. In order to prevent the nut $e$ from rotating when the bolt is screwed through it, I provide a rib $c^3$ on the extension $c$, preferably at each end of said extension, so that the position of the bolt in the groove may be reversed at will and still remain operative. The rib $c^3$ coöperates with one of the flat sides of the nut and prevents the nut from rotating. The head $d^2$ of the bolt may be operated by a socket or forked wrench or may be slotted to receive a screw-driver, if desired.

Whenever it becomes necessary to remove the collar from or to readjust it upon the shaft, it is only necessary to partially unscrew the bolt $d$, thus allowing the split collar to spring open slightly and release its grip upon the shaft, when the collar may be adjusted upon the shaft or may be removed entirely.

My described clamping device provides powerful and convenient means for removably securing cams, pulleys, and the like mechanisms to their shafts and in comparison with ordinary set-screws has the decided advantage of leaving the shaft intact instead of indenting and springing said shaft, as is usually the case with such set-screws.

Having thus described my invention, I claim—

1. In combination with a split collar having a bolt-seat of groove form and means at the outer ends of said groove for retaining a bolt in its seat, a bolt and means thereon coöperating with said means on the collar.

2. In combination with a split collar having a bolt-seat of open-groove form, a bolt, and means for retaining the said bolt in its seat consisting of counterbores at the ends of said groove and coöperating means on the bolt.

3. In combination with a split collar having a bolt-seat of groove form located at the split side of said collar and extending at right angles to the axial center of said collar, said collar being provided with a rib, a bolt, and a nut adapted to coöperate with the bolt and rib to prevent turning of the nut.

4. In combination with a split collar formed at its split side with a bolt-seat of groove form and with counterbored ends, a bolt adapted to be seated in said groove, and a nut on said bolt; said bolt and nut being formed with flanges adapted to coact with the said counterbores, as herein set forth.

5. In combination with a split collar formed at its split side with a bolt-seat of groove form, a bolt and nut adapted to be seated in said groove, said collar having coöperating means to retain the bolt in its seat, and means extending from the collar for holding the nut against rotation relatively to the bolt.

6. In combination with a split collar having a radial extension grooved through its length and counterbored at its ends, a bolt having a flange fitted to one of said counterbores, a nut, and means to permit the position of the bolt in the groove being reversed and still remain operative.

In testimony whereof I have signed my name to this specification in the presence of two subscribing witnesses.

DANIEL M. LESTER.

Witnesses:
FRANK H. ALLEN,
FRANK S. DEWIRE.